US006581636B2

United States Patent  (10) Patent No.: US 6,581,636 B2
Carepa et al.  (45) Date of Patent: Jun. 24, 2003

(54) VALVE BODY FOR DIVE TANK WITH TWO OUTLETS, AND DIVE TANK PROVIDED WITH A VALVE COMPRISING SUCH A BODY

(75) Inventors: Stephane Carepa, Saint Paul (FR); Nicolas Peyron, La Gaude (FR)

(73) Assignee: La Spirotechnique Industrielle et Commerciale, Carros (FR)

( * ) Notice: Subject to any disclaimer, the term of this patent is extended or adjusted under 35 U.S.C. 154(b) by 0 days.

(21) Appl. No.: 09/928,426

(22) Filed: Aug. 14, 2001

(65) Prior Publication Data

US 2002/0189690 A1 Dec. 19, 2002

(30) Foreign Application Priority Data

Jun. 18, 2001 (FR) .............................. 01 07948

(51) Int. Cl.$^7$ ................................. F15D 1/04
(52) U.S. Cl. ................... 137/561 A; 137/876; 137/883; 137/887; 128/205.24
(58) Field of Search .............................. 137/561 A, 876, 137/887, 883; 128/205.24

(56) References Cited

U.S. PATENT DOCUMENTS

| 2,275,608 | A | * | 3/1942 | Brisbane | 137/883 |
| 3,853,144 | A | * | 12/1974 | Whelan | 137/883 |
| 5,042,525 | A | * | 8/1991 | Clark | 137/381 |
| 5,056,563 | A | * | 10/1991 | Glossop | 137/883 |
| 5,176,169 | A | * | 1/1993 | Ferguson | 137/561 A |
| 6,082,359 | A | * | 7/2000 | Preston | 128/205.24 |

* cited by examiner

Primary Examiner—A. Michael Chambers
(74) Attorney, Agent, or Firm—Young & Thompson

(57) ABSTRACT

The body of the valve has two outlets whose axes are offset in the direction of the axis of the mounting base by a distance greater than 5 mm, typically between 20 and 60 mm, the spacing between the outlet axes being greater than 60 mm and typically less than 130 mm. This arrangement avoids problems of positioning and collision between the upstream circuitry connected to the outlets in the use configuration of the valve on a dive tank.

16 Claims, 2 Drawing Sheets

VALVE BODY FOR DIVE TANK WITH TWO OUTLETS, AND DIVE TANK PROVIDED WITH A VALVE COMPRISING SUCH A BODY

BACKGROUND OF THE INVENTION

The present invention relates to underwater dive valves with two outlets, of the type comprising a valve body with two outlets for connection to user circuits disposed on opposite sides of the axis of the mounting base of the body on the tank.

DESCRIPTION OF THE RELATED ART

In known valves of this type, as shown and described on pages 10 and 11 of the brochure Spiro-Aqualung of 1996, or more recently, on page 14 of the brochure 2000 of Aqualung (valve "V"), the valve body is symmetrical with the axes of the outlets in a same plane orthogonal to the axis of the base. The outlets being provided to mount two first stage expanders each supplying at least generally two compressed gas hoses, the symmetrical arrangement gives rise to problems of emplacement and size of the expanders and their associated tubing which can, during use, give rise to mechanical problems.

SUMMARY OF THE INVENTION

The present invention has the object of largely eliminating these drawbacks by providing an architecture for the valve body limiting the interference between the conduits connected to the two outlets.

To do this, according to one aspect of the invention, the outlets are offset relative to the base, preferably in the direction of the axis of the base (vertical plane) and/or in a sagittal plane orthogonal to the vertical plane.

According to other more particular characteristics, the axes of the outlets are offset in the direction of the axis of the base relative to this latter, this offset (vertical) is comprised between about 5 and 80 mm, typically between about 20 and 60 mm;

the spacing (horizontal) between the outlet axes, in a direction orthogonal to the axis of the base, is comprised between about 60 and 130 mm, typically between about 70 and 100 mm, this horizontal spacing being preferably substantially centered on the axis of the base.

The invention also relates to a dive tank provided with a valve comprising a valve body of the above type.

BRIEF DESCRIPTION OF THE DRAWINGS

Other characteristics and advantages of the invention will become apparent from the following description of embodiments, given by way of illustration but not limiting, with respect to the accompanying drawings, in which.

DESCRIPTION OF THE PREFERRED EMBODIMENT

Figure 1:
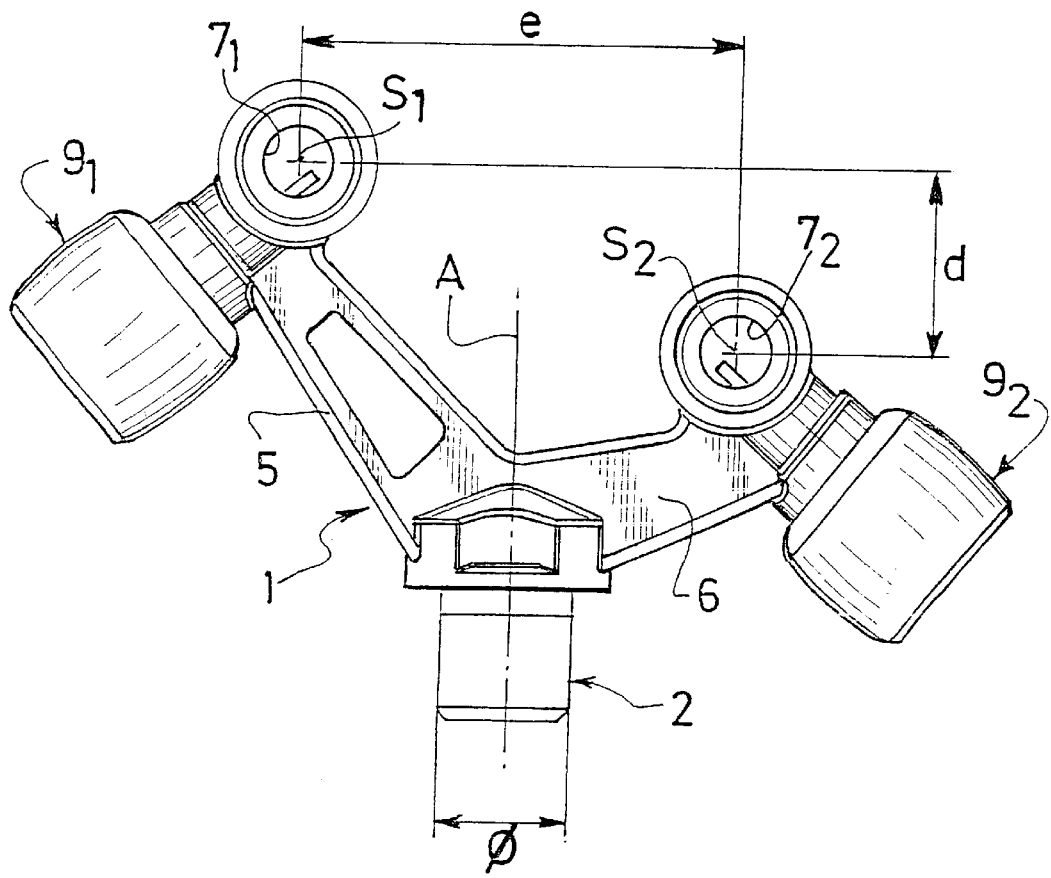
FIG. 1 is a front elevational view of one embodiment of a valve body according to the invention.

The valve body 1 according to the invention, typically made of one or two pieces forged of galvanized brass, generally comprises a screwthreaded base 2, with a longitudinal axis A, serving for mounting in the neck 3 of a dive tank 4 containing air or other respiratory gaseous mixtures, and, in the illustrated example, two arms 5 and 6 extending in a V from the base and at the ends of which are formed gas outlets $7_1$ and $7_2$ opening laterally in the same direction (forwardly in FIG. 1) for mounting, directly by DIN threading or by a screw stirrup, first stage expander bodies $8_1$ and $8_2$ (FIG. 2) from which extend a series of tubes connected to at least one second stage expander and to a pressure gauge or a dive control housing. The length of the arms can be individually reduced or elongated.

As shown in FIG. 1, the internal passages between each outlet $7_1$ and $7_2$ and the inlet in the base 2 is selectively manually closable by a valve $9_1$, $9_2$ as described in EP-A-0 750 147, in the name of the applicant.

As is seen in FIG. 1, according to one aspect of the invention, the axes $S_1$ and $S_2$ (perpendicular to the plane of FIG. 1) of the outlets $7_1$ and $7_2$ are vertically offset (in the direction of the longitudinal axis of symmetry A of the base 2) by a distance d greater than 5 mm, typically greater than 10 mm, and are spaced (horizontally) by a distance e. For a nominal diameter φ of the base 2, the vertical offset d is less than 80 mm and preferably comprised between 20 and 60 mm. Similarly, the horizontal spacing e is greater than 60 mm and typically less than 130 mm, preferably comprised between 70 and 100 mm.

Preferably, in particular for monobloc valve bodies, as in the illustrated example, the spacing e is substantially centered on the axis A.

Figure 2:
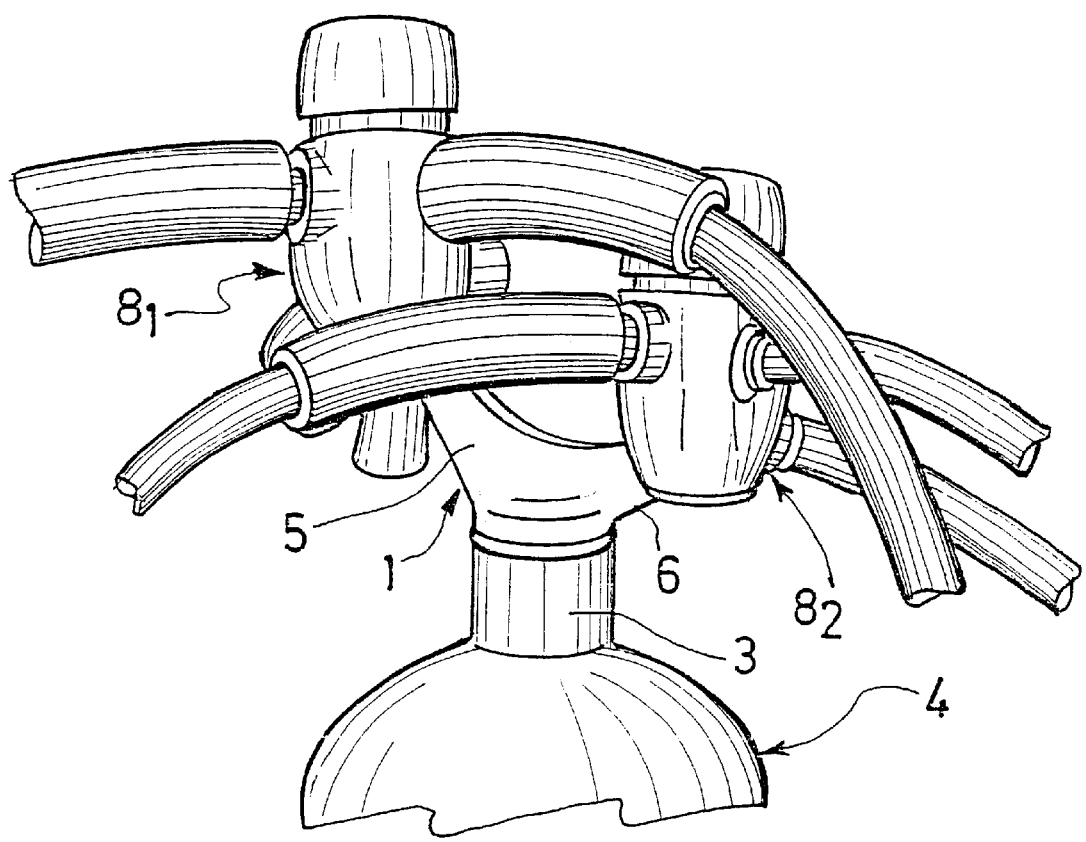
FIG. 2 is a perspective view of such a valve body mounted on a dive tank and having tubing connected to the two outlets.

As is seen in FIG. 2, with such an arrangement, the interference between the tubes leaving the expander bodies $8_1$ and $8_2$ is greatly reduced, which facilitates their mounting/unmounting and limits the risk of wear between them.

Although the invention has been described with respect to particular embodiments, it is not thereby limited but is subject to modifications and variations which will be apparent to those skilled in the art in the scope of the following claims. In particular, according to the fields of use, the outlets can be offset in the vertical plane, as shown, and, by a small distance, less than 50 mm, in the sagittal plane. As the case may be, the outlets can be offset substantially only in the sagittal plane.

What is claimed is:

1. A valve body for a dive tank, comprising a base for mounting the body on a tank and two high pressure outlets for connection to user circuits, the outlets disposed on opposite sides off the axis of the base and offset relative to the base, and the outlets having a spacing between the axes of the outlets in a direction orthogonal to the axis of the base greater than about 60 mm.

2. Valve body for a dive tank, comprising two outlets for connection to user circuits, disposed on opposite sides of the axis of the mounting base of the body on a tank, characterized in that the outlets ($7_1$, $7_2$) are offset relative to the base (2), characterized in that a spacing (e) between the axes ($S_1$, $S_2$) of the outlets ($7_1$, $7_2$) in a direction orthogonal to the axis (A) of the base (2) is greater than about 60 mm.

3. Body according to claim 2, characterized in that the axes ($S_1$, $S_2$) of the outlets ($7_1$, $7_2$) are offset (d) in the direction of the axis (A) of the base (2) relative to this latter.

4. Body according to claim 2, characterized in that the offset (d) is comprised between about 5 mm and 80 mm.

5. Body according to claim 2, characterized in that the offset (d) is less than about 80 mm.

6. Body according to claim 2, characterized in that the offset (d) is comprised between about 20 and 60 mm.

7. Body according to claim 2, characterized in that a spacing (e) between the axes ($S_1$, $S_2$) of the outlets ($7_1$, $7_2$) in a direction orthogonal to the axis (A) of the base (2) is less than about 130 mm.

8. Body according to claim 2, characterized in that a spacing (e) between the axes ($S_1$, $S_2$) of the outlets ($7_1$, $7_2$) in a direction orthogonal to the axis (A) of the base (2) is comprised between about 70 and 100 mm.

9. Body according to claim 2, characterized in that, in said direction orthogonal to the axis (A) of the base, a spacing (e) between the axes ($S_1$, $S_2$) of the outlets ($7_1$, $7_2$) in a direction orthogonal to the axis (A) of the base (2) is substantially centered on this axis (A).

10. Body according to claim 2, characterized in that the outlets ($7_1$, $7_2$) are formed at the ends off two arms forming a v (5, 6) connecting to the base (2).

11. Dive tank provided with a valve comprising a body (1) according to claim 2.

12. Body according to claim 2, characterized in that, in said direction orthogonal to the axis (A) off the base, the spacing (e) is substantially centered on this axis (A).

13. The valve body of claim 2, further comprising valve means for manually closing said outlets.

14. A valve body for a dive tank, comprising a base having an axis for mounting the body on a tank and two separate high pressure outlets for connection to high pressure circuits,
the two outlets offset relative to the base,
the outlets spaced from each other both in the direction of the axis and in a direction orthogonal to the axis.

15. The valve body of claim 14, wherein the outlets are spaced apart from each other in the direction orthogonal to the axis by at least 60 mm.

16. The valve body of claim 14, wherein the outlets are spaced from each other in the direction orthogonal to the axis and substantially centered to the axis.

* * * * *